United States Patent
Furudate et al.

(10) Patent No.: US 11,161,097 B2
(45) Date of Patent: Nov. 2, 2021

(54) PHOTOCATALYST LAMINATE

(71) Applicant: SHIN-ETSU CHEMICAL CO., LTD., Tokyo (JP)

(72) Inventors: Manabu Furudate, Kamisu (JP); Tomohiro Inoue, Kamisu (JP); Ryosuke Yoshii, Annaka (JP); Kohei Masuda, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 150 days.

(21) Appl. No.: 16/311,993

(22) PCT Filed: Jun. 6, 2017

(86) PCT No.: PCT/JP2017/020993
§ 371 (c)(1),
(2) Date: Dec. 20, 2018

(87) PCT Pub. No.: WO2018/042804
PCT Pub. Date: Mar. 8, 2018

(65) Prior Publication Data
US 2019/0210007 A1 Jul. 11, 2019

(30) Foreign Application Priority Data

Aug. 29, 2016 (JP) .............................. JP2016-166490

(51) Int. Cl.
| | | |
|---|---|---|
| *B01J 23/34* | (2006.01) | |
| *B01J 35/02* | (2006.01) | |
| *B32B 27/18* | (2006.01) | |
| *C09D 183/04* | (2006.01) | |
| *C09D 5/00* | (2006.01) | |
| *C09D 201/00* | (2006.01) | |
| *B32B 27/00* | (2006.01) | |
| *C09D 127/12* | (2006.01) | |
| *B01J 21/06* | (2006.01) | |
| *B01J 21/08* | (2006.01) | |
| *B01J 31/06* | (2006.01) | |
| *B01J 31/12* | (2006.01) | |
| *B01J 31/38* | (2006.01) | |
| *B01J 33/00* | (2006.01) | |
| *B01J 35/00* | (2006.01) | |
| *B01J 37/00* | (2006.01) | |
| *B01J 37/02* | (2006.01) | |
| *B01J 37/03* | (2006.01) | |
| *B01J 37/04* | (2006.01) | |

(52) U.S. Cl.
CPC .............. *B01J 23/34* (2013.01); *B01J 21/06* (2013.01); *B01J 21/063* (2013.01); *B01J 21/08* (2013.01); *B01J 31/06* (2013.01); *B01J 31/125* (2013.01); *B01J 31/127* (2013.01); *B01J 31/38* (2013.01); *B01J 33/00* (2013.01); *B01J 35/004* (2013.01); *B01J 35/0013* (2013.01); *B01J 35/02* (2013.01); *B01J 37/0018* (2013.01); *B01J 37/0221* (2013.01); *B01J 37/0228* (2013.01); *B01J 37/0244* (2013.01); *B01J 37/033* (2013.01); *B01J 37/04* (2013.01); *B32B 27/00* (2013.01); *B32B 27/18* (2013.01); *C09D 5/00* (2013.01); *C09D 127/12* (2013.01); *C09D 183/04* (2013.01); *C09D 201/00* (2013.01); *B01J 2231/005* (2013.01); *B01J 2531/002* (2013.01)

(58) Field of Classification Search
CPC . B01J 23/34; B01J 21/06; B01J 21/063; B01J 21/08; B01J 31/06; B01J 31/125; B01J 31/127; B01J 31/38; B01J 33/00; B01J 35/0013; B01J 35/004; B01J 35/02; B01J 37/0018; B01J 37/0221; B01J 37/0228; B01J 37/0244; B01J 37/033; B01J 37/04; B01J 2231/005; B01J 2531/002; B32B 27/00; B32B 27/18; C09D 5/00; C09D 127/12; C09D 183/04; C09D 201/00
USPC ........................ 502/150, 242, 350; 428/411.1
See application file for complete search history.

(56) References Cited

U.S. PATENT DOCUMENTS

| | | | |
|---|---|---|---|
| 6,228,480 B1 | 5/2001 | Kimura et al. | |
| 6,787,236 B2 * | 9/2004 | Kimura | ................ C09D 183/04 428/412 |
| 2001/0007507 A1 * | 7/2001 | Iimura | .................. B01J 35/004 359/241 |

(Continued)

FOREIGN PATENT DOCUMENTS

| | | |
|---|---|---|
| JP | 10-225640 A | 8/1998 |
| JP | 2000-6303 A | 1/2000 |

(Continued)

OTHER PUBLICATIONS

International Search Report, issued in PCT/JP2017/020993, dated Aug. 1, 2017.

(Continued)

*Primary Examiner* — Patricia L. Hailey
(74) *Attorney, Agent, or Firm* — Birch, Stewart, Kolasch & Birch, LLP

(57) ABSTRACT

A photocatalyst laminate which is composed of an undercoat layer provided on a substrate and a photocatalyst layer laminated on the surface of the undercoat layer. The undercoat layer contains (A) 100 parts by mass of a resin component and (B) 0.1-50 parts by mass of fine core-shell particles, each of which has a core that is formed of a fine tetragonal titanium oxide solid solution particle wherein tin and manganese are solid-solved and a shell that is formed from silicon oxide on the outside of the core. This photocatalyst laminate is not susceptible to decrease in the photocatalyst function even under outdoor exposure for a long period of time, and is thus capable of providing a coated article that exhibits excellent weather resistance.

7 Claims, No Drawings

(56) References Cited

U.S. PATENT DOCUMENTS

| | | | |
|---|---|---|---|
| 2007/0148424 A1* | 6/2007 | Toyoda | B32B 27/18 428/292.1 |
| 2010/0261022 A1 | 10/2010 | Higuchi et al. | |
| 2011/0136660 A1 | 6/2011 | Terasaki et al. | |
| 2012/0225770 A1* | 9/2012 | Tamaoka | C09D 5/1618 502/1 |
| 2014/0023855 A1 | 1/2014 | Masuda et al. | |
| 2015/0125707 A1* | 5/2015 | Masuda | C09D 7/48 428/447 |
| 2015/0299417 A1 | 10/2015 | Masuda et al. | |

FOREIGN PATENT DOCUMENTS

| | | | | |
|---|---|---|---|---|
| JP | 2001-131768 A | 5/2001 | | |
| JP | 2001-199001 A | 7/2001 | | |
| JP | 2004-315722 A | 11/2004 | | |
| JP | 2010-5608 A | 1/2010 | | |
| JP | 2010-261012 A | 11/2010 | | |
| JP | 2012-180241 | * 9/2012 | | C01G 23/053 |
| JP | 2014-19611 A | 2/2014 | | |
| JP | 2016-14132 A | 1/2016 | | |
| WO | WO 97/00134 A1 | 1/1997 | | |
| WO | WO-2008117017 A1 * | 10/2008 | | A61K 8/29 |

OTHER PUBLICATIONS

Written Opinion of the International Searching Authority, issued in PCT/JP2017/020993, dated Aug. 1, 2017.

* cited by examiner

PHOTOCATALYST LAMINATE

TECHNICAL FIELD

This invention relates to a photocatalyst laminate, and more particularly, to a photocatalyst laminate adapted to be disposed on a substrate, comprising an undercoat layer containing UV-shielding inorganic nanoparticles and a photocatalyst layer.

BACKGROUND ART

Since photocatalyst coatings formed on the surface of various substrates contain photocatalysts such as titanium oxide which render the substrate surface hydrophilic upon light exposure, the coatings have functions of readily washing away surface stains with water and decomposing various organic compounds.

The photocatalyst coatings having the photocatalytic function are utilized in applications for cleaning, deodorizing and sterilizing substrate surfaces. Their application to articles, for example, exterior and interior members of buildings, and plastic molded parts such as film is in progress.

When the substrate surface is made of organic material, the method of directly forming a photocatalyst coating on the surface of an article or substrate is known to give rise to the problem that the substrate surface in contact with the photocatalyst is decomposed and degraded.

As the means for solving the problem, Patent Document 1, for example, proposes to form an undercoat layer between the photocatalyst layer and the substrate for protecting the substrate surface. The undercoat layer protects the substrate from degradation by a photocatalytic action, but undesirably fails to protect from degradation by UV exposure.

It is known that as exterior and interior members of buildings and plastic molded parts such as film are exposed to UV in sunlight for a long period of time, coatings on the substrate surface and substrates themselves are deteriorated. Particularly in the case of coatings containing pigments, color fading and gloss degradation are significant problems.

For solving these and other problems, Patent Document 2 proposes to form an undercoat layer between the photocatalyst layer and the substrate, the undercoat layer being composed of a coating composition comprising a silicone-modified resin and a UV absorber such as a benzotriazole compound or hydroxyphenyltriazine compound. The undercoat layer protects the coating and substrate from degradation by a photocatalytic action and protects from degradation by UV exposure. Thus, a photocatalyst-coated substrate having improved weather resistance is obtained.

Since the UV absorbers composed of organic compounds such as benzotriazole compounds and hydroxyphenyltriazine compounds as used in Patent Document 2 are fully compatible with resins in coating compositions, they are used not only in the photocatalyst application, but also often in the application for imparting UV-shielding properties to coatings.

In an actual attempt to form a photocatalyst layer on a substrate via an undercoat layer containing a benzotriazole compound as mentioned above and expose it to outdoor weather for a long period of time, it is found that the photocatalytic function which is initially satisfactory is gradually lost, surface hydrophilicity is lowered, and anti-fouling properties are exacerbated.

PRIOR ART DOCUMENTS

Patent Documents

Patent Document 1: WO 97/00134
Patent Document 2: JP-A 2010-005608
Patent Document 3: JP-A 2014-019611
Patent Document 4: JP-A 2016-014132

SUMMARY OF INVENTION

Technical Problem

An object of the invention, which has been made under the above-mentioned circumstances, is to provide a photocatalyst laminate which is unsusceptible to a lowering of photocatalytic function even on long-term outdoor exposure, and an article covered with the photocatalyst laminate.

Solution to Problem

In Patent Documents 3 and 4, the inventors already found that core/shell nanoparticles each consisting of a core in the form of a tetragonal titanium oxide solid-solution nanoparticle having tin and manganese incorporated in solid solution and a shell of silicon oxide around the core are useful as the UV absorber suited for use in UV-shielding hard coat materials. The inventors have found that an article covered with a photocatalyst laminate comprising an undercoat layer containing the core/shell nanoparticles as the UV absorber and a photocatalyst layer has an esthetic appearance and anti-fouling properties and maintains a photocatalytic function even on long-term UV exposure. The invention is predicated on this finding.

The invention is defined below.

1. A photocatalyst laminate adapted to be disposed on a substrate, the laminate comprising an undercoat layer and a photocatalyst layer laid on a surface of the undercoat layer,
   the undercoat layer comprising
   (A) 100 parts by weight of a resin component and
   (B) 0.1 to 50 parts by weight of core/shell nanoparticles each consisting of a core in the form of a tetragonal titanium oxide solid-solution nanoparticle having tin and manganese incorporated in solid solution and a shell of silicon oxide around the core.
2. The photocatalyst laminate of 1 wherein the undercoat layer has a thickness of 0.01 to 10 μm and the photocatalyst layer has a thickness of 0.01 to 10 μm.
3. The photocatalyst laminate of 1 or 2 wherein the resin component is one or more resins selected from the group consisting of silicone resins, silicone-modified resins, and fluoro-resins.
4. The photocatalyst laminate of any one of 1 to 3, having a Haze value of up to 5.
5. The photocatalyst laminate of any one of 1 to 4 wherein the photocatalyst layer has a contact angle with water of up to 30° on its surface after UV exposure in an accumulative UV energy quantity of 1,500 MJ/m$^2$.
6. The photocatalyst laminate of any one of 1 to 5 wherein the shell of silicon oxide on the surface of the core/shell nanoparticle has an organosilyl group bonded via a siloxane bond.
7. An article comprising a substrate and a photocatalyst laminate disposed thereon,
   the photocatalyst laminate being the photocatalyst laminate of any one of 1 to 6, the undercoat layer of the laminate being disposed adjacent to the substrate.

8. A coating composition for forming an undercoat layer adapted to be formed between a substrate and a photocatalyst layer disposed on the substrate, the undercoat layer having a UV-shielding function, the undercoat layer-forming coating composition comprising (A) 100 parts by weight of a resin component and (B) 0.1 to 50 parts by weight of core/shell nanoparticles each consisting of a core in the form of a tetragonal titanium oxide solid-solution nanoparticle having tin and manganese incorporated in solid solution and a shell of silicon oxide around the core.

Advantageous Effects of Invention

The photocatalyst laminate of the invention includes an undercoat layer containing the specific core/shell nanoparticles having UV-shielding properties. The provision of the photocatalyst laminate on the surface of a substrate imparts an esthetic appearance and anti-fouling properties to the substrate and maintains a photocatalytic function even on long-term UV exposure.

DESCRIPTION OF EMBODIMENTS

Below the invention is described in detail.

The invention provides a photocatalyst laminate adapted to be disposed on a substrate, the laminate comprising a photocatalyst layer exhibiting a photocatalytic function and an undercoat layer having the function of bonding the substrate and the photocatalyst layer and playing the role of protecting the substrate from degradation by photocatalytic action and UV exposure.

The undercoat layer is defined herein as comprising (A) 100 parts by weight of a resin component and (B) 0.1 to 50 parts by weight of core/shell nanoparticles each consisting of a core in the form of a tetragonal titanium oxide solid-solution nanoparticle having tin and manganese incorporated in solid solution and a shell of silicon oxide around the core.

[1] Resin Component

The resin component is not particularly limited as long as it bonds the photocatalyst layer to the substrate, allows core/shell nanoparticles to effectively disperse therein, and is effective for suppressing photocatalytic degradation of the substrate. Examples include acrylic resins, silicone resins, fluoro-resins, alkyd resins, polyester resins, epoxy resins, chlorine base resins, polyolefin resins, and modified resins thereof, which may be used alone or in admixture.

As used herein, the modified resin means that one resin selected from the foregoing resins is modified with another resin selected from the foregoing resins.

Of these resins, silicone resins, silicone-modified resins and fluoro-resins are preferred from the standpoint of preventing degradation of the substrate by a photocatalytic action.

It is known that silicone resins are generally weather resistant and also resistant against degradation by a photocatalytic action.

The silicone resin used herein may be selected from a variety of commercially available silicone resins. Examples include polydimethylsiloxane (commonly referred to as silicone), silicone alkoxy oligomers having alkoxy groups in the molecular structure and polymers thereof, reactive silicone oligomers (commonly referred to as silicone resin) and polymers thereof, which may be used alone or in admixture.

These silicone resins may be used in any form including solventless, organic solvent solution, and water dispersed emulsion forms.

Particularly when the performance factors required for the undercoat layer including the standpoints of physical properties of resin film such as adhesion to various substrates and photocatalyst coatings, room temperature cure, weather resistance, crack resistance, and hardness, and the standpoint of application to buildings are taken into account, at least a portion of the resin component should preferably be selected from silicone alkoxy oligomers having organic groups and silicone aqueous emulsions capable of forming a silicone film.

The silicone alkoxy oligomer or silicone aqueous emulsion should preferably account for at least 50% by weight, more preferably at least 80% by weight of the total weight of silicone resins used when it is considered to effectively prevent the photocatalyst layer, undercoat layer and substrate from degradation by long-term outdoor exposure.

The silicone alkoxy oligomer is generally obtained from (co)hydrolytic condensation of at least one compound selected from alkoxysilanes and partial hydrolytic condensates thereof. Although the degree of polymerization is not definitely determined, the oligomers generally encompass from dimers and trimers to oligomers having a molecular weight of about 1,000.

Exemplary of the silicone alkoxy oligomer is a silicone oligomer obtained from (co)hydrolytic condensation of at least one compound selected from alkoxysilanes having the general formula (1) and partial hydrolytic condensates thereof.

$$(R^1)_m(R^2)_n Si(OR^3)_{4-m-n} \tag{1}$$

In formula (1), $R^1$ and $R^2$ are each independently hydrogen or a substituted or unsubstituted monovalent hydrocarbon group while they may bond with each other.

The monovalent hydrocarbon group is preferably of 1 to 12 carbon atoms, more preferably 1 to 8 carbon atoms. Examples include alkyl groups such as methyl, ethyl, n-propyl, n-butyl, n-pentyl, n-hexyl, n-heptyl, and n-octyl; cycloalkyl groups such as cyclopentyl and cyclohexyl; alkenyl groups such as vinyl and allyl; aryl groups such as phenyl; halo-substituted hydrocarbon groups such as chloromethyl, γ-chloropropyl and 3,3,3-trifluoropropyl; (meth)acryloxy, epoxy, mercapto, amino or isocyanate-substituted hydrocarbon groups such as γ-methacryloxypropyl, γ-glycidoxypropyl, 3,4-epoxycyclohexylethyl, γ-mercaptopropyl, γ-aminopropyl and γ-isocyanatopropyl; and isocyanurate groups corresponding to hydrocarbon groups having plural isocyanate moieties in which isocyanate moieties are bonded together.

Of these, alkyl groups are preferred for use in the application where mar resistance and weather resistance are required, and epoxy, (meth)acryloxy or isocyanurate-substituted hydrocarbon groups are preferred for use in the application where toughness and dyeability are required.

$R^3$ is a $C_1$-$C_3$ alkyl group, examples of which include methyl, ethyl, n-propyl and isopropyl. Of these, methyl and ethyl are preferred in consideration of high reactivity during hydrolytic condensation and the resulting alcohol $R^3OH$ having a high vapor pressure enough to distill off.

In formula (1), m and n are each independently an integer of 0 or 1, and m+n is 0, 1 or 2.

The raw material having formula (1) wherein m=0 and n=0, from which the silicone alkoxy oligomer is prepared, is a tetraalkoxysilane of the formula: $Si(OR^3)_4$ or a partial hydrolytic condensate thereof.

Examples of the tetraalkoxysilane or partial hydrolytic condensate thereof include tetramethoxysilane, tetraethoxysilane, tetraisopropoxysilane, tetrabutoxysilane, and tetramethoxysilane, or partial hydrolytic condensates thereof.

The raw material having formula (1) wherein m=1 and n=0, or m=0 and n=1, from which the silicone alkoxy oligomer is prepared, is a trialkoxysilane of the formula: $R^1Si(OR^3)_3$ or $R^2Si(OR^3)_3$ or a partial hydrolytic condensate thereof.

Examples of the trialkoxysilane or partial hydrolytic condensate thereof include hydrogentrimethoxysilane, hydrogentriethoxysilane, methyltrimethoxysilane, methyltriethoxysilane, methyltriisopropoxysilane, ethyltrimethoxysilane, ethyltriethoxysilane, ethyltriisopropoxysilane, propyltrimethoxysilane, propyltriethoxysilane, propyltriisopropoxysilane, phenyltrimethoxysilane, vinyltrimethoxysilane, allyltrimethoxysilane, γ-methacryloxypropyltrimethoxysilane, γ-methacryloxypropyltriethoxysilane, γ-acryloxypropyltrimethoxysilane, γ-glycidoxypropyltrimethoxysilane, γ-glycidoxypropyltriethoxysilane, β-(3,4-epoxycyclohexyl)ethyltrimethoxysilane, γ-chloropropyltrimethoxysilane, 3,3,3-trifluoropropyltrimethoxysilane, 3,3,3-trifluoropropyltriethoxysilane, perfluorooctylethyltrimethoxysilane, γ-mercaptopropyltrimethoxysilane, γ-aminopropyltrimethoxysilane, γ-aminopropyltriethoxysilane, N-(2-aminoethyl)aminopropyltrimethoxysilane, γ-isocyanatopropyltrimethoxysilane, to γ-isocyanatopropyltriethoxysilane, tris(3-trimethoxysilylpropyl)isocyanurate in which isocyanate moieties bond together, tris(3-triethoxysilylpropyl)isocyanurate, and methyltrimethoxysilane, or partial hydrolytic condensates thereof.

The raw material having formula (1) wherein m=1 and n=1, from which the silicone alkoxy oligomer is prepared, is a dialkoxysilane of the formula: $R^1R^2Si(OR^3)_2$ or a partial hydrolytic condensate thereof.

Examples of the dialkoxysilane or partial hydrolytic condensate thereof include methylhydrogendimethoxysilane, methylhydrogendiethoxysilane, dimethyldimethoxysilane, dimethyldiethoxysilane, methylethyldimethoxysilane, diethyldimethoxysilane, diethyldiethoxysilane, methylpropyldimethoxysilane, methylpropyldiethoxysilane, diisopropyldimethoxysilane, phenylmethyldimethoxysilane, vinylmethyldimethoxysilane, γ-glycidoxypropylmethyldimethoxysilane, γ-glycidoxypropylmethyldiethoxysilane, β-(3,4-epoxycyclohexyl)ethylmethyldimethoxysilane, γ-methacryloxypropylmethyldimethoxysilane, γ-methacryloxypropylmethyldiethoxysilane, γ-mercaptopropylmethyldimethoxysilane, γ-aminopropylmethyldiethoxysilane, and N-(2-aminoethyl)aminopropylmethyldimethoxysilane, or partial hydrolytic condensates thereof.

The partial hydrolytic condensate of an alkoxysilane is obtained by adding water to at least one selected from the foregoing alkoxysilanes, and heating the mixture in the presence of a catalyst while stirring, to induce partial (co) hydrolysis and condensation.

The silicone alkoxy oligomer is commercially available. Examples include partial hydrolytic condensates of tetramethoxysilane which are commercially available under the trade name of M Silicate 51 from Tama Chemicals Co., Ltd., MSI51 from Colcoat Co., Ltd., and MS51 and MS56 from Mitsubishi Chemical Co., Ltd.; partial hydrolytic condensates of tetraethoxysilane which are commercially available under the trade name of Silicate 35 and Silicate 45 from Tama Chemicals Co., Ltd., ESI40 and ESI48 from Colcoat Co., Ltd.; partial co-hydrolytic condensates of tetramethoxysilane and tetraethoxysilane which are commercially available under the trade name of FR-3 from Tama Chemicals Co., Ltd. and EMSi48 from Colcoat Co., Ltd.; alkoxyoligomers having a methyl group as the organic group which are commercially available under the trade name of KC-895, KR-515, KR-500, X-40-9225, X-40-9246, and X-40-9250 from Shin-Etsu Chemical Co., Ltd.; alkoxyoligomers having methyl/phenyl groups as the organic group which are commercially available under the trade name of KR-410N, X-40-9227, KR-510, KR-9218, and KR-213 from Shin-Etsu Chemical Co., Ltd.; and room temperature humidity curable coating compositions obtained by blending the foregoing condensates, which are commercially available under the trade name of KR-400, X-40-2327, and KR-401 from Shin-Etsu Chemical Co., Ltd.

The silicone alkoxy oligomer may be used in combination with a cure catalyst for the purpose of promoting cure.

As the cure catalyst, any appropriate one for a particular oligomer may be used. Examples include titanium catalysts (e.g., D-25 and D-20 by Shin-Etsu Chemical Co., Ltd.), aluminum catalysts (e.g., DX-9740 by Shin-Etsu Chemical Co., Ltd.), and phosphoric acid catalysts (e.g., X-40-2309 by Shin-Etsu Chemical Co., Ltd.).

On the other hand, the silicone aqueous emulsions include resin base and rubber base silicone aqueous emulsions.

Examples of the resin base silicone aqueous emulsions include emulsions of silicone resins such as MQ silicone resin, methylsilicone resin and methylphenylsilicone resin. These emulsions are commercially available, for example, MQ resin emulsions (e.g., KM-9717, X-52-8005, X-51-1302M by Shin-Etsu Chemical Co., Ltd.), methyl resin emulsions (e.g., Polon MF-28 by Shin-Etsu Chemical Co., Ltd.), and phenyl resin emulsions (X-52-8148 by Shin-Etsu Chemical Co., Ltd.).

The aqueous emulsion may be used in combination with a cure catalyst for the purpose of promoting cure. As the cure catalyst, any appropriate one for a particular resin may be used. For example, a catalyst for silicone emulsions (Cat CS by Shin-Etsu Chemical Co., Ltd.) is appropriate.

Exemplary of the rubber base silicone aqueous emulsion are emulsions of silicone rubbers. They are commercially available, for example, silicone rubber film-forming agents (Polon MF-56, KM-2002L-1, KM-2002T, and Polon MF-40 by Shin-Etsu Chemical Co., Ltd.

The silicone-modified resin generally refers to a resin in which a base resin is combined or modified with a silicone resin for the purpose of improving film properties such as weather resistance and hardness of the base resin. It is known that the silicone-modified resin is resistant to degradation by a photocatalytic action, as compared with the base resin.

Examples of the silicone-modified resin include silicone-modified acrylic resins and silicone-modified urethane resins. A variety of commercially available silicone-modified resins for paints and coats may be used herein.

The silicone-modified acrylic resin is a resin in which an acrylic resin is combined with a silicone resin. Examples include resins obtained by mixing an acrylic resin with a silicone resin, copolymers of acrylic and silicone components, acrylic resins which are modified at side chains or ends with silicone, and core/shell resins consisting of a core of acrylic resin and a shell of silicone resin.

Commercially available examples of the silicone-modified acrylic resin include acrylic resins for organic-inorganic hybrid coatings (Ceranate WSA-1070 and Ceranate WSA-1060 by DIC Corp.), organic-inorganic hybrid emulsions (Acrit KS-3705 by Taisei Fine Chemical Co., Ltd.), and silicone-acrylic hybrid resins (Chaline R-170, Chaline R-1705, Chaline FE-2030N, and Chaline R-170BX by Nissin Chemical Co., Ltd.)

These silicone-modified acrylic resins may be used in combination with cure catalysts for the purpose of promoting cure.

The silicone-modified urethane resin is a resin in which a urethane resin is combined or modified with a silicone resin. Examples include resins obtained by mixing a urethane resin with a silicone resin, copolymers of urethane and silicone components, urethane resins which are modified at side chains or ends with silicone, and core/shell resins consisting of a core of urethane resin and a shell of silicone resin.

Commercially available examples of the silicone-modified urethane resin include polysiloxane-complexed urethane resins (Ceranate WHW-822 by DIC Corp.) and silicone-urethane hybrid resins (Chaline RU-911 by Nissin Chemical Co., Ltd.).

These silicone-modified urethane resins may be used in combination with cure catalysts for the purpose of promoting cure.

The content of silicone resin is preferably at least 10%, more preferably at least 30% based on the weight of the overall silicone-modified resin.

The fluoro-resin is known as having excellent weather resistance and also known to be highly durable against degradation by a photocatalytic action.

Examples of the fluoro-resin include polymers of tetrafluoroethylene, trifluoroethylene or difluoroethylene, and copolymers thereof with vinyl ether.

Commercially available fluoro-resins, which are coating forms of the foregoing fluoro-resins, may be used, for example, resins for weather resistant paints (Zeffle GK-570, Zeffle GK-580, Zeffle SE-310, Zeffle SE-405, and Zeffle SE-700 by Daikin Industries, Ltd.), fluoro-resins for paints (Lumiflon by AGC Chemicals Co., Ltd.), and PVDF emulsions (Kynar Aquatec by Arkema S.A.).

[2] Core/Shell Nanoparticles

As defined above, the core/shell nanoparticles used herein each consist of a core in the form of a tetragonal titanium oxide solid-solution nanoparticle having tin and manganese incorporated in solid solution and a shell of silicon oxide around the core.

Titanium oxide generally includes three types, rutile, anatase and brookite types. Herein titanium oxide of tetragonal rutile type is used as solid-solution solvent for tin and manganese because it has a low photocatalytic activity and high UV absorptivity.

The tin component as one solute is not particularly limited as long as it is derived from a tin salt. Included are tin oxide and tin chalcogenides such as tin sulfide, with tin oxide being preferred.

Exemplary tin salts include tin halides such as tin fluoride, tin chloride, tin bromide and tin iodide, tin halogenoids such as tin cyanide and tin isothiocyanide, and tin mineral acid salts such as tin nitrate, tin sulfate and tin phosphate. Of these, tin chloride is preferred for stability and availability.

Tin in the tin salt may have a valence of 2 to 4, with tetravalent tin being preferred.

The manganese component as another solute is not particularly limited as long as it is derived from a manganese salt. Included are manganese oxide and manganese chalcogenides such as manganese sulfide, with manganese oxide being preferred.

Exemplary manganese salts include manganese halides such as manganese fluoride, manganese chloride, manganese bromide and manganese iodide, manganese halogenoids such as manganese cyanide and manganese isothiocyanide, and manganese mineral acid salts such as manganese nitrate, manganese sulfate and manganese phosphate. Of these, manganese chloride is preferred for stability and availability.

Manganese in the manganese salt may have a valence of 2 to 7, with divalent manganese being preferred.

When tin and manganese form a solid solution with tetragonal titanium oxide, the amount of tin incorporated in solid solution is to provide a molar ratio of titanium to tin (Ti/Sn) of preferably 10/1 to 1,000/1, more preferably 20/1 to 200/1.

The amount of manganese incorporated in solid solution is to provide a molar ratio of titanium to manganese (Ti/Mn) of preferably 10/1 to 1,000/1, more preferably 20/1 to 200/1.

If the amount of tin or manganese in solid solution form is to provide a Ti/Sn or Ti/Mn molar ratio of less than 10, there is observed considerable light absorption in the visible region assigned to tin and manganese. If the Ti/Sn or Ti/Mn molar ratio exceeds 1,000, photocatalytic activity is not fully deprived, and the crystal system may turn to anatase type having low UV absorptivity.

The solid solution form of tin and manganese components may be either substitutional or interstitial.

The substitutional solid solution refers to a solid solution form in which tin and manganese substitute at the site of titanium(IV) ion in titanium oxide. The interstitial solid solution refers to a solid solution form in which tin and manganese fit in the space between crystal lattices of titanium oxide.

The interstitial type tends to create F-center which causes coloring, and due to poor symmetry around a metal ion, the Franck-Condon factor of vibronic transition at the metal to ion increases, leading to more absorption of visible light. For this reason, the substitution type is preferred.

A shell of silicon oxide is formed around the core of nanoparticulate tetragonal titanium oxide having tin and manganese incorporated in solid solution. The shell may contain silicon oxide as the major component and another component(s) such as tin, aluminum and the like.

The shell of silicon oxide may be formed by any desired techniques. For example, the silicon oxide shell may be formed by reacting an organic silicon compound or inorganic silicon compound to surfaces of titanium oxide nanoparticles.

Examples of the organic silicon compound which can be used herein include tetraalkoxysilanes. The silicon oxide shell may be formed outside nanoparticulate titanium oxide cores by hydrolytic condensation of a tetraalkoxysilane.

Suitable tetraalkoxysilanes include commonly available ones such as tetramethoxysilane, tetraethoxysilane, tetra(n-propoxy)silane, tetra(i-propoxy)silane, and tetra(n-butoxy)silane. Of these, tetraethoxysilane is preferred from the standpoints of reactivity and safety.

Commercially available tetraalkoxysilanes may be used, for example, tetraethoxysilane KBE-04 (Shin-Etsu Chemical Co., Ltd.).

Hydrolytic condensation of a tetraalkoxysilane may be performed in water, optionally in the presence of a condensation catalyst such as ammonia, aluminum salts, organoaluminum compounds, tin salts, or organotin compounds. Of these condensation catalysts, ammonia is especially preferred because it also serves as a dispersant for the core nanoparticles.

Examples of the inorganic silicon compound include alkali silicates and active silicic acids obtained from cation exchange of alkali silicates. The silicon oxide shell may be formed outside nanoparticulate titanium oxide cores by mixing titanium oxide nanoparticles with the inorganic silicon compound.

Suitable alkali silicates include commonly available ones such as sodium silicate and potassium silicate.

Commercially available alkali silicates may also be used, for example, Soda Silicate (Fuji Kagaku Corp.).

The active silicic acid is obtained by contacting an alkali silicate aqueous solution with a cation exchange resin to induce cation exchange.

The raw material for the alkali silicate aqueous solution includes the above-mentioned alkali silicates. In this case too, commercially available Soda Silicate (Fuji Kagaku Corp.) may be used.

As the cation exchange resin, an appropriate one be selected from commonly available cation exchange resins, for example, Amberjet 1024H (Organo Corp.).

The method for contacting an alkali silicate aqueous solution with a cation exchange resin is, for example, by adding a strongly acidic cation exchange resin (H+ type) to a water dilution of alkali silicate aqueous solution, or by flowing a water dilution of alkali silicate aqueous solution through an ion exchange column filled with a strongly acidic cation exchange resin (H+ type).

Although the concentration of the alkali silicate aqueous solution is not particularly limited, it is preferred from the standpoints of production efficiency and anti-gelation of the active silicic acid obtained therefrom that the concentration is 1 to 10% by weight, more preferably 1 to 5% by weight, and even more preferably 2 to 4% by weight, calculated as silica.

The cation exchange treatment is preferably carried out such that the resulting active silicic acid solution may be at pH 1 to 5, more preferably pH 2 to 4.

The method for mixing the alkali silicate or active silicic acid with titanium oxide nanoparticles is, for example, by gradually adding an aqueous solution of alkali silicate or active silicic acid to a dispersion of titanium oxide nanoparticles although the method is not particularly limited.

The silicon oxide shells preferably account for 5 to 50% by weight, more preferably 10 to 45% by weight, and even more preferably 15 to 40% by weight based on the overall core/shell tetragonal titanium oxide solid solution. If the silicon oxide proportion is less than 5 wt %, then shell formation may be insufficient. If the silicon oxide proportion exceeds 50 wt %, then the core/shell nanoparticles are likely to agglomerate together to render the dispersion opaque, and a coating containing the same may have a low UV absorptivity and fail to exert satisfactory UV-shielding properties.

It is noted that the titanium oxide used herein may be further doped with a metal other than tin and manganese. The term "doping" is used in a broad sense and encompasses both simple doping and doping via a chemical bond.

The diameter (average cumulative particle size) of core/shell nanoparticles may be measured by a variety of methods.

A 50% cumulative diameter ($D_{50}$) in a volume basis particle size distribution as measured by the dynamic light scattering method using laser light is used herein, but observation by electron microscopy is possible as supporting evidence. Although the value obtained by such measurement method is not dependent on a particular measurement system, for example, Nanotrac UPA-EX150 (Nikkiso Co., Ltd.) may be used in the dynamic light scattering method. Also, transmission electron microscope H-9500 (Hitachi High-Technologies Ltd.), for example, is used in the electron microscopy.

Since it is important that the undercoat layer according to the invention be transparent in the visible region, the core/shell nanoparticles should preferably have an average cumulative particle size ($D_{50}$) of 1 to 200 nm, more preferably 1 to 100 nm, even more preferably 1 to 80 nm, and most preferably 1 to 50 nm. If the core/shell nanoparticles have a $D_{50}$ in excess of 200 nm, which is greater than the wavelength of the visible region, sometimes noticeable scattering occurs. If $D_{50}$ is less than 1 nm, the core/shell nanoparticles have an extremely large overall surface area in the system, indicating difficult handling of particles.

Also for the purpose of enhancing the affinity of core/shell nanoparticles to the resin component or organic solvent, the silicon oxide shell at surfaces of core/shell nanoparticles may be surface treated with organosilyl groups via siloxane bonds.

The organosilyl groups may be introduced, for example, by modifying surfaces of core/shell nanoparticles with a silane compound having the general formula (I), a (co) hydrolytic condensate of the silane compound, or a mixture thereof.

$$R^4_p Si(Y)_{4-p} \quad (I)$$

Herein $R^4$ which may be the same or different is hydrogen or a substituent group selected from the group consisting of a $C_1$-$C_{20}$ alkyl group which may be substituted with (meth) acrylic, oxiranyl, amino, mercapto, isocyanate or fluorine, a $C_2$-$C_{20}$ alkenyl group, a $C_6$-$C_{20}$ aryl group, and a (poly) dimethylsiloxy group of up to 50 silicon atoms, Y is a substituent group selected from the group consisting of alkoxy, acetoxy, enol, hydroxyl and chlorine, and p is an integer of 1 to 3.

Of the alkyl groups, $C_1$-$C_6$ alkyl groups are preferred, with methyl, ethyl and n-propyl being more preferred.

Of the alkenyl groups, $C_2$-$C_6$ alkenyl groups are preferred, with vinyl and allyl being more preferred.

Of the aryl groups, $C_6$-$C_{10}$ aryl groups are preferred, with phenyl being more preferred.

The (poly)dimethylsiloxy groups preferably have 1 to 50 silicon atoms, more preferably 1 to 30 silicon atoms.

Suitable alkoxy groups include methoxy, ethoxy, n-propoxy and n-butoxy, with methoxy being preferred.

Examples of the silane compound having formula (I) wherein p=1 include alkoxysilanes such as hydrogentrimethoxysilane, hydrogentriethoxysilane, methyltrimethoxysilane, methyltriethoxysilane, methyltriisopropoxysilane, ethyltrimethoxysilane, ethyltriethoxysilane, ethyltriisopropoxysilane, propyltrimethoxysilane, propyltriethoxysilane, propyltriisopropoxysilane, phenyltrimethoxysilane, vinyltrimethoxysilane, allyltrimethoxysilane, γ-methacryloxypropyltrimethoxysilane, γ-methacryloxypropyltriethoxysilane, γ-acryloxypropyltrimethoxysilane, γ-glycidoxypropyltrimethoxysilane, γ-glycidoxypropyltriethoxysilane, β-(3,4-epoxycyclohexyl)ethyltrimethoxysilane, γ-chloropropyltrimethoxysilane, 3,3,3-trifluoropropyltrimethoxysilane, 3,3,3-trifluoropropyltriethoxysilane, perfluorooctylethyltrimethoxysilane, γ-mercaptopropyltrimethoxysilane, γ-aminopropyltrimethoxysilane, γ-aminopropyltriethoxysilane, N-(2-aminoethyl)aminopropyltrimethoxysilane, γ-isocyanatopropyltrimethoxysilane, γ-isocyanatopropyltriethoxysilane, phenyltrimethoxysilane, phenyltriethoxysilane, tris(3-trimethoxysilylpropyl)isocyanurate in to which isocyanate radicals bond together, tris(3-triethoxysilylpropyl)isocyanurate, partial hydrolytic condensates of methyltrimethoxysilane, commercially available under the trade name of KC-89S and X-40-9220 from Shin-Etsu Chemical Co., Ltd., and partial hydrolytic condensates of methyltrimethoxysilane and γ-glycidoxypropyltrimethoxysilane, commercially available under the trade name of X-41-1056 from Shin-Etsu Chemical Co., Ltd.; allylsilanes such as triallylmethylsilane, triallylethylsilane, and triallylisopropylsilane; acetoxysilanes such as triacetoxymethylsilane, triacetoxyethylsilane, triacetoxypropylsilane, and triacetoxyphenylsilane; chlorosilanes such as trichloromethylsilane, trichloroethylsilane, trichloropropylsilane, and trichlorophenylsilane; and enolsilanes such as triisopropenyloxymethylsilane, ethyltriisopropenyloxysilane, triisopropenyloxypropylsilane, and phenyltriisopropenyloxysilane.

Examples of the silane compound having formula (I) wherein p=2 include methylhydrogendimethoxysilane, methylhydrogendiethoxysilane, dimethyldimethoxysilane, dimethyldiethoxysilane, methylethyldimethoxysilane, diethyldimethoxysilane, diethyldiethoxysilane, methylpropyldimethoxysilane, methylpropyldiethoxysilane, diisopropyldimethoxysilane, phenylmethyldimethoxysilane, vinylmethyldimethoxysilane, γ-glycidoxypropylmethyldimethoxysilane, γ-glycidoxypropylmethyldiethoxysilane, β-(3,4-epoxycyclohexyl)ethylmethyldimethoxysilane, γ-methacryloxypropylmethyldimethoxysilane, γ-methacryloxypropylmethyldiethoxysilane, γ-mercaptopropylmethyldimethoxysilane, γ-aminopropylmethyldiethoxysilane, and N-(2-aminoethyl)aminopropylmethyldimethoxysilane.

Examples of the silane compound having formula (I) wherein p=3 include trimethylmethoxysilane, trimethylethoxysilane, triethylmethoxysilane, n-propyldimethylmethoxysilane, n-propyldiethylmethoxysilane, isopropyldimethylmethoxysilane, isopropyldiethylmethoxysilane, propyldimethylethoxysilane, n-butyldimethylmethoxysilane, n-butyldimethylethoxysilane, n-hexyldimethylmethoxysilane, n-hexyldimethylethoxysilane, n-pentyldimethylmethoxysilane, n-pentyldimethylethoxysilane, n-hexyldimethylmethoxysilane, n-hexyldimethylethoxysilane, n-decyldimethylmethoxysilane, and n-decyldimethylethoxysilane.

Examples of the silane compound having formula (I) wherein $R^4$ is (poly)dimethylsiloxane include compounds having the general formula (II) shown below.

In formula (II), q is preferably an integer of 0 to 50, more preferably 5 to 40, even more preferably 10 to 30. If q is more than 50, silicone oil nature becomes so strong that the dissolution of the surface treated organosol in various resins is limited in some cases. The compound of formula (II) wherein q=30 as average structure is available under the trade name X-24-9822 from Shin-Etsu Chemical Co., Ltd.

[Chem. 1]

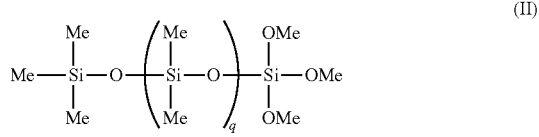

(II)

Herein Me stands for methyl.

The silane compounds for surface treatment may be used alone, as a mixture of two or more compounds, or as a cohydrolytic condensate of two or more compounds. Also, the core/shell nanoparticles may be surface treated stepwise with the silane compound(s) of the same or different types.

The amount of the silane compound used is preferably 0.5 to 50 times, more preferably 1 to 25 times, even more preferably 2 to 10 times the weight of the core/shell nanoparticles. If the amount exceeds 50 times, gelation may occur. If the amount is less than 0.5 time, agglomeration may occur as a result of short coverage.

The surface treatment with the silane compound is preferably carried out using a colloidal dispersion of the core/shell nanoparticles in water as dispersing medium.

The colloidal dispersion should preferably have a dispersoid concentration of 1 to 35% by weight, more preferably 5 to 30% by weight, even more preferably 10 to 25% by weight, as considered from the standpoints of increasing production efficiency and preventing gelation.

The dispersing medium may contain a monohydric alcohol which is miscible with water in an arbitrary ratio in the step of preparing the water dispersed colloidal solution. The monohydric alcohol which is miscible with water in an arbitrary ratio may be the co-solvent used during preparation of the core/shell nanoparticles or a hydrolytic byproduct of a metal alkoxide in the sol-gel reaction.

Examples of the monohydric alcohol which is miscible with water in an arbitrary ratio include methanol, ethanol, 1-propanol and 2-propanol.

Further, during the surface treatment, the reaction solution may be diluted with an organic solvent if necessary.

Examples of the diluting solvent include monohydric alcohols such as methanol, ethanol, 1-propanol, 2-propanol and 1-butanol; polyhydric alcohols such as ethylene glycol, propylene glycol and glycerol; ethers such as propylene glycol monomethyl ether, ethylene glycol monomethyl ether, glyme and diglyme; ketones such as acetone and methyl isobutyl ketone; esters such as ethyl acetate and propylene glycol monomethyl ether acetate; and reactive esters such as hexanediol diacrylate, trimethylolpropane triacrylate, pentaerythritol tetraacrylate, and dipentaerythritol hexaacrylate. Of these, ethanol and 2-propanol are preferred.

In the practice of surface treatment, the silane compound may be added to the water dispersed colloidal solution by any techniques such as dropwise addition in liquid, dropwise addition out of liquid, and addition in portions, with the dropwise addition in liquid being preferred.

The temperature at which the silane compound is added is preferably 0 to 45° C., more preferably 5 to 40° C., even more preferably 10 to 35° C., as considered from the aspect of preventing alteration of the colloidal water dispersion and incidental hydrolytic condensation of the silane compound. There is a likelihood that the temperature of the reaction solution rises to near or below 70° C. by the reaction heat of hydrolytic condensation.

In the practice of surface treatment, an acid or base catalyst may be added for the purpose of promoting the reaction, if necessary.

Suitable base catalysts include potassium hydroxide, sodium hydroxide, potassium carbonate, sodium carbonate, and basic ion exchange resins.

Suitable acid catalysts include hydrochloric acid, sulfuric acid, methanesulfonic acid, trifluoromethanesulfonic acid, acetic acid, and cationic ion exchange resins.

Exemplary of the cationic ion exchange resins are Amberlite (Organo Corp.), Lewatit (Lanxess), Purolite (Purolite), and Muromac (Muromachi Chemicals Inc.).

The catalyst is preferably used in an amount of 0.01 to 20% by weight, more preferably 0.1 to 10% by weight, even more preferably 1 to 5% by weight based on the core/shell nanoparticles, from the aspect of properly controlling the reaction rate.

The introduction of organosilyl groups to the surface of core/shell nanoparticles is observable by performing IR spectroscopy or solid NMR spectroscopy analysis and confirming peaks characteristic of organosilyl.

The amount of organosilyl groups introduced may be estimated from the difference between a percent weight loss of core/shell nanoparticles prior to reaction with organosilyl groups and a percent weight loss of surface-treated nanoparticles having organosilyl groups. The amount of organosilyl groups introduced is preferably at least 2% by weight based on the surface-treated nanoparticles, from the aspect of rendering the nanoparticles dispersible in an organic solvent.

After the surface treatment with the silane compound as discussed above, the dispersing medium in the reaction solution may be replaced by a polar organic solvent, if necessary. In particular, exudation of the dispersing medium from the dispersion, and replacement and concentration of the dispersing medium are preferably performed by ultrafiltration. In this way, the solid concentration of the dispersion in a filtration chamber is adjusted to preferably 1 to 30% by weight, more preferably 5 to 25% by weight, even more preferably 10 to 20% by weight.

The dispersing medium contains water in the water dispersed colloidal solution, alcohols derived from silicates formed by hydrolytic condensation of the silicon compound added or the hydrolytic condensate thereof, an optionally added monohydric alcohol, and other organic solvents.

For the ultrafiltration of the dispersing medium which is a complex mixture as mentioned above, a porous ceramic filter is preferably used.

Specifically, a filter including an inorganic ceramic membrane having an average pore size of preferably 5 nm to less than 20 nm, more preferably 6 nm to 18 nm, and most preferably 7 nm is used. The filter is preferably configured as a rotatable disk.

The porous inorganic ceramic membrane may be prepared by any well-known techniques. The materials of which the porous inorganic ceramic membrane is made include spinel, alumina, titania and zirconia base materials. For example, the spinel base material may be synthesized by the known technique (Ueno, S. et al., Journal of Physics: Conference Series 2009, Vol. 165, No. 1, Fabrication of porous magnesium spinel with cylindrical pores by unidirectional solidification, or Zhang, Guo-Chang, et al., 2000, Vol. 2000, No. 03, $MgAl_2O$ Ultrafiltration Ceramic Membrane Derived from Mg—Al Double Alkoxide).

Preferably the pore size is controlled by adjusting synthesis conditions and the growth of spinel crystal.

The filter is preferably formed by depositing a surface layer having a uniform pore size on a porous disk-shaped unglazed ceramic plate of alumina or the like, by the sol-gel method and epitaxial growth.

The porous disk-shaped unglazed ceramic plate of alumina used herein is typically one having a pore size of 0.05 to 1 µm.

The surface layer has an average pore size of preferably 5 nm to less than 20 nm, more preferably 6 nm to 18 nm, and most preferably 7 nm. The pore size of the filter is preferably determined by electron microscopy. The electron microscope used to this end may be a scanning electron microscope, transmission electron microscope or atomic force microscope.

With respect to the size of the disk-shaped filter, its diameter is preferably 100 mm to less than 500 mm, more preferably 120 mm to 300 mm, and even more preferably 140 mm to 200 mm. If the diameter is less than 100 mm, a certain surface area is not ensured, and little shear stress is applied upon rotation. If the diameter exceeds 500 mm, an extra torque may be required for rotation and a filter with too large a diameter is fragile and difficult to handle.

The thickness of the filter is preferably 1 mm to less than 10 mm, more preferably 3 mm to 5 mm, when it is considered to insure mechanical strength and the volume of the filtration chamber.

The filter may be fabricated by the well-known technique, or commercially available filters may be used.

The dispersing medium is exudated under a static pressure of preferably less than 0.5 MPa, more preferably up to 0.4 MPa, even more preferably up to 0.3 MPa, and most preferably 0.03 to 0.2 MPa, in consideration of a simple choice of the interface for the ultrafiltration system and efficient exudation of the dispersing medium.

The static pressure is preferably achieved by hydraulic pressure or compression pneumatic pressure, using a hydraulic head tube whose surface is in contact with air or a closed system. Especially the compression pneumatic pressure system is preferred because the unit is compact. Compression air may be readily produced by any well-known techniques or commercially available compressors.

In replacement of the dispersing medium, a shear stress of preferably 0.1 to 10 Pa, more preferably 0.5 to 5 Pa, and even more preferably 1 to 5 Pa is applied to the disk-shaped filter. The shear stress may be achieved by fluidization of the dispersion or by rotation of the disk-shaped filter. Desirably the shear stress is achieved by rotation of the filter because a high shear rate is available at the filter surface.

The shear stress may be computed from the wall-to-wall distance in the filtration chamber and the rotational speed. If necessary, the filtration chamber may be equipped with an appropriate baffle for the purpose of reducing the wall-to-wall distance in the filtration chamber. It is a well-known practice that the shear stress is increased by utilizing rotation and baffle.

A maximum shear stress ($\tau$) acting on a circumference may be computed, for example, according to equation (1):

$$\tau = (\eta \cdot \pi \cdot \phi \cdot \omega)/L \, [Pa] \quad \text{equation (1)}$$

wherein $\phi$ is a diameter (m) of the disk-shaped filter, $\omega$ is a rotational speed (rps) of the filter, L is a wall-to-wall distance (m) between filter and filtration chamber, $\pi$ is circle ratio, and $\eta$ is a viscosity (Pa·s) of the dispersion.

Assuming an example wherein diameter $\phi=0.15$ m, filter rotational speed $\omega=16.7$ rps ($\cong 1{,}000$ rpm), circle ratio $\pi=3.14$, dispersion viscosity $\eta=0.001$ Pa·s, and wall distance $L=0.003$ m, then $\tau=(0.001\times3.14\times0.15\times16.7)/0.003\cong2.6$ Pa. The shear stress may be controlled to fall in the preferred range by changing parameters $\phi$, $\omega$ and L.

The rotational energy applied to the dispersion is preferably prescribed by the shear stress, but may also be prescribed by a fluid state.

The fluid state may be prescribed by Reynolds number. The agitation Reynolds number is preferably 3,000 to 5,000,000, more preferably 5,000 to 1,000,000, and even more preferably 10,000 to 500,000, when it is taken into account that dispersion efficiency is increased by preventing laminar flow agitation and production efficiency is increased by properly controlling the amount of energy required for agitation.

The Reynolds number (Re) may be determined from equation (2):

$$Re = \rho \cdot \omega \cdot \phi^2 / \eta \quad \text{equation (2)}$$

wherein $\rho$ is a density (kg/m³), $\omega$ is a rotational speed (rps), $\phi$ is a filter diameter (m) and $\eta$ is a viscosity (Pa·s).

The core/shell nanoparticle dispersion used herein preferably has a density $\rho$ of 900 to 2,000 kg/m³, more preferably 1,000 to 1,500 kg/m³, and a viscosity $\eta$ of 0.001 to 0.05 Pa·s, more preferably 0.002 to 0.01 Pa·s.

For example, when a core/shell nanoparticle dispersion with $\rho$=1,000 kg/m³ and $\eta$=0.001 Pas is treated by a disk-shaped filter having $\phi$=0.15 m at $\omega$=16.7 rps, Re is computed to be ~3.8×10⁵. Re can be adjusted to fall in the desired range by an appropriate choice of $\omega$ and $\phi$.

For the purpose of improving agitation efficiency, a reactor equipped with a baffle may be used.

The temperature at which the dispersing medium is replaced is preferably 5 to 80° C., more preferably 10 to 60° C., even more preferably 15 to 50° C., and most preferably 20 to 40° C., from the standpoint of preventing freezing or volatilization of the dispersing medium and gelation or fault when a reactive ester is used.

In general, the viscosity of the dispersion depends on the temperature. Since the viscosity affects rotational torque, the temperature is preferably adjusted so that any extra load may not be applied to an electromagnetic rotating machine and/or motor.

In replacement of the dispersing medium, it is also possible to remove unreacted compounds and by-products by continuous ultrafiltration, if necessary.

Examples of the organic solvent used in the dispersing medium replacement include mono- and polyhydric alcohols such as methanol, ethanol, 1-propanol, 2-propanol, cyclopentanol, ethylene glycol, propylene glycol, β-thiodiglycol, butylene glycol and glycerol; ethers such as diethyl ether, dipropyl ether, cyclopentyl methyl ether, ethylene glycol dimethyl ether, diethylene glycol dimethyl ether, triethylene glycol dimethyl ether, ethylene glycol monomethyl ether, ethylene glycol monoethyl ether, ethylene glycol monopropyl ether, ethylene glycol monobutyl ether, propylene glycol monomethyl ether, propylene glycol monoethyl ether, propylene glycol monopropyl ether, propylene glycol monobutyl ether, butylene glycol monomethyl ether, butylene glycol monoethyl ether, butylene glycol monopropyl ether, and butylene glycol monobutyl ether; esters such as methyl formate, ethyl formate, propyl formate, butyl formate, methyl acetate, ethyl acetate, propyl acetate, butyl acetate, methyl propionate, ethyl propionate, propyl propionate, butyl propionate, methyl butyrate, ethyl butyrate, propyl butyrate, butyl butyrate, methyl benzoate, ethyl benzoate, propyl benzoate, butyl benzoate, dimethyl oxalate, diethyl oxalate, dipropyl oxalate, dibutyl oxalate, dimethyl malonate, diethyl malonate, dipropyl malonate, dibutyl malonate, ethylene glycol diformate, ethylene glycol diacetate, ethylene glycol dipropionate, ethylene glycol dibutyrate, propylene glycol diacetate, propylene glycol dipropionate, propylene glycol dibutyrate, ethylene glycol methyl ether acetate, propylene glycol methyl ether acetate, butylene glycol monomethyl ether acetate, ethylene glycol ethyl ether acetate, propylene glycol ethyl ether acetate, and butylene glycol monoethyl ether acetate; ketones such as acetone, diacetone alcohol, diethyl ketone, methyl ethyl ketone, methyl isobutyl ketone, methyl n-butyl ketone, dibutyl ketone, cyclopentanone, cyclohexanone, cycloheptanone, and cyclooctanone; and amides such as dimethylformamide, dimethylacetamide, tetraacetylethylenediamide, tetraacetylhexamethylenetetramide, and N,N-dimethylhexamethylenediamine diacetate.

Of these, methanol, ethanol, 1-propanol, 2-propanol, and propylene glycol monomethyl ether are preferred for dispersion of core/shell nanoparticles and ease of distillation of the dispersing medium.

A volume of the organic solvent used in the solvent replacement is preferably 1 to 20 times, more preferably 2 to 10 times, and even more preferably 3 to 8 times the volume of the filtration chamber, when the efficiency of replacement of the dispersing medium and production efficiency are taken into account.

[3] Undercoat Layer

According to the invention, the undercoat layer may be formed from an undercoat layer-forming coating composition containing the resin component and the core/shell nanoparticles, both defined above.

In the undercoat layer, the core/shell nanoparticles are present in an amount of 0.1 to 50 parts by weight, preferably 1 to 20 parts by weight per 100 parts by weight of the resin component, from the standpoints of achieving a UV-shielding effect and preventing agglomeration of nanoparticles. Correspondingly, the undercoat layer-forming coating composition preferably contains 100 parts by weight of the resin component and 0.1 to 50 parts by weight, more preferably 1 to 20 parts by weight of the core/shell nanoparticles.

When the resin component is mixed with the core/shell nanoparticles, the core/shell nanoparticles may be used in the form of powder, a water dispersion resulting from the above-mentioned method for preparing core/shell nanoparticles, or an organic solvent dispersion obtained by replacing water by an organic solvent. Any of these forms may be selected depending on the type of the resin component used.

In the embodiment wherein the resin component is a solvent-containing composition, the amount of the core/shell nanoparticles blended is determined, based on the resin component in the composition which is 100 parts by weight.

In the embodiment wherein the core/shell nanoparticles are used as a dispersion, the dispersion is blended such that the solid content thereof may fall in the above-defined range per 100 parts by weight of the resin component.

In the undercoat layer-forming coating composition, the total concentration of the resin component and core/shell nanoparticles is preferably 0.1 to 50% by weight, more preferably 0.5 to 20% by weight. If the concentration is less than 0.1 wt %, an undercoat layer obtained from single application may be thin, indicating a low working efficiency. If the concentration exceeds 50 wt %, core/shell nanoparticles may be likely to agglomerate.

In addition to the resin component and core/shell nanoparticles, the undercoat layer may contain optional additives such as inorganic fillers, antioxidants, dyes, pigments, flame retardants, and leveling agents insofar as the object of the invention is not compromised. Each of the optional additives may be used alone or in admixture.

Examples of the inorganic filler include particles of inorganic oxides and complex oxides such as aluminum oxide, silicon oxide, boron oxide, cerium oxide, indium tin oxide, zirconium oxide, tin oxide, and iron oxide.

The inorganic filler is added for the purpose of imparting mechanical properties, UV-shielding ability or electroconductivity, for example.

For the purpose of imparting mechanical properties, silicon oxide, aluminum oxide, tin oxide, boron oxide and a complex oxide containing at least one of the metal elements thereof are often used. For the purpose of imparting conductivity, indium oxide-tin oxide complex is often used.

Exemplary antioxidants include conventional well-known antioxidants such as 2,6-di-t-butyl-4-methylphenol. Blending the antioxidant in the undercoat layer is effective for preventing coloration, white turbidity or oxidative degradation thereof.

The undercoat layer-forming coating composition may be prepared by mixing the resin component, core/shell nanoparticles, and optional additives in an arbitrary order.

An undercoat layer may be formed by coating the undercoat layer-forming coating composition onto a substrate and curing the composition.

The substrate used herein is not particularly limited and includes exterior and interior members of buildings, molded plastics, coated steel plates, transparent films, decorative films, wood items, ceramics, tile, glass, metals, and composites thereof.

These substrates which have been surface treated, specifically by conversion treatment, corona discharge treatment, plasma treatment, acid or alkaline treatment are also useful. Also included are decorative laminates comprising a substrate and a surface layer formed thereon from a coating material of different type from the substrate.

Notably, a primer layer, rust-preventive layer, gas barrier layer, water-proof layer, heat ray-shielding layer or the like may be previously formed on the substrate.

The undercoat layer-forming coating composition may be applied to the substrate by any of well-known coating techniques. Suitable coating techniques include brush coating, spray coating, dipping, flow coating, roll coating, curtain coating, spin coating, and knife coating.

When the undercoat layer-forming coating composition is cured, the coating may be air dried by holding it in air, or the coating may be heated in order to reduce the cure time. Preference is given to the composition which is curable by air drying.

The undercoat layer preferably has a thickness of 0.01 to 10 μm, more preferably 0.05 to 5 μm when it is taken into account to maintain the photocatalytic function of the photocatalyst laminate for a long time.

If the thickness is less than 0.01 μm, the photocatalytic function may not be maintained and the ability to protect decorative substrates from UV radiation be reduced. If the thickness exceeds 10 μm, the undercoat layer itself may be degraded as by cracking during long-term outdoor exposure.

[4] Photocatalyst Layer

The photocatalyst layer is typically composed of photocatalyst particles and a binder therefor.

The photocatalyst layer may be prepared from a photocatalyst layer-forming coating composition comprising at least photocatalyst particles and a binder.

The photocatalyst particles are not particularly limited as long as they have a photocatalytic activity. Examples include titanium oxide, zinc oxide, tungsten oxide, tin oxide, and iron oxide.

Examples of the photocatalyst particles further having visible light activity include the foregoing metal oxides having photocatalyst activity which are doped in their crystals with 0.01 to 50% by weight of a metal element selected from among vanadium, chromium, manganese, iron, copper, niobium, molybdenum, rhodium, tin and tungsten, or nitrogen, sulfur, phosphorus or carbon, and the foregoing metal oxides bearing on their surface a metal selected from among copper, iron, nickel, gold, silver, platinum, palladium, rhodium, and ruthenium or a metal compound.

Of these, titanium oxide base photocatalysts, especially anatase type titanium oxide photocatalysts are preferred for their high photocatalytic activity.

Further preferably, photocatalyst particles are used in the form of a photocatalyst particle dispersion, that is, photocatalyst particles being finely dispersed in a dispersing medium, in order to enhance the transparency of the photocatalyst layer to maintain the aesthetic appearance of the substrate.

The photocatalyst particles in the dispersion should preferably have an average particle size of up to 30 nm, more preferably up to 20 nm, even more preferably up to 15 nm, when it is taken into account to enhance the transparency of the photocatalyst layer. The lower limit of average particle size of the photocatalyst particles is typically 5 nm though not critical.

The dispersing medium used for the photocatalyst particle dispersion is typically an aqueous medium, preferably water. A mixture of water and a hydrophilic organic solvent which is miscible with water in any arbitrary ratio is also acceptable.

Preferably water is, for example, deionized water, distilled water or pure water.

Examples of the hydrophilic organic solvent include alcohols such as methanol, ethanol, and 2-propanol, glycols such as ethylene glycol, and glycol ethers such as ethylene glycol monomethyl ether, ethylene glycol monoethyl ether, and propylene glycol n-propyl ether.

When a solvent mixture is used, the content of the hydrophilic organic solvent in the mixture is preferably more than 0% by weight and up to 50% by weight, more preferably up to 20% by weight, even more preferably up to 10% by weight.

The concentration of photocatalyst particles in the photocatalyst particle dispersion is preferably 0.1 to 50% by weight, more preferably 0.5 to 20% by weight.

The binder is not particularly limited as long as it can bond photocatalyst particles onto the undercoat layer. Examples include resins such as acrylic resins, silicone resins, fluoro-resins, alkyd resins, polyester resins, epoxy resins, chlorine base resins, and polyolefin resins, modified resins thereof, inorganic oxides such as silica, alumina, titania and zirconia, and inorganic oxide coat precursors which cure to form inorganic oxide coats. Two or more of these examples may be used in combination.

Of the foregoing binders, a resin selected from silicone resins, silicone-modified resins and fluoro-resins or an inorganic oxide coat precursor selected from silica, alumina, titania and zirconia is preferred from the standpoint of preventing degradation by photocatalytic action. A silica coat precursor (silicate) capable of forming a silica coat on curing is more preferred because the resulting photocatalyst layer is high in photocatalytic function and transparency.

The binder may be used in the form of a dispersion or solution of the binder dispersed or dissolved in a solvent.

Suitable solvents are as exemplified above as the dispersing medium of the photocatalyst dispersion. The binder dispersion or solution preferably contains the binder in a concentration of 0.1 to 50% by weight.

In the photocatalyst layer-forming coating composition, the ratio of the photocatalyst to the binder is preferably from 1/99 to 80/20, more preferably from 5/95 to 50/50 as weight ratio. If the content of the photocatalyst is lower than the range, the photocatalytic function may not be exerted to a full extent. If the content is more than the range, the binder is short to retain photocatalyst particles, with a possibility that the photocatalyst layer is degraded by long-term outdoor exposure.

In the embodiment wherein the binder is a solvent-containing composition, the amount of photocatalyst particles is determined, based on the binder in the composition which is 100 parts by weight.

In the embodiment wherein the photocatalyst particles are used as a dispersion, the dispersion is blended such that the solid content thereof may fall in the above-defined range per 100 parts by weight of the binder.

In the photocatalyst layer-forming coating composition, the total concentration of the photocatalyst and binder components is preferably 0.1 to 50% by weight, more preferably 0.5 to 20% by weight. If the concentration is less than 0.1 wt %, a photocatalyst layer obtained from single application may be thin, indicating a low working efficiency. If the concentration exceeds 50 wt %, photocatalyst particles may be likely to agglomerate.

By applying the photocatalyst layer-forming coating composition to the undercoat layer and curing the composition to form a photocatalyst layer, a photocatalyst laminate may be obtained. A laminate-covered article may be obtained therefrom.

The technique for applying the photocatalyst layer-forming coating composition may be selected from the techniques exemplified above for the undercoat layer-forming coating composition.

When the photocatalyst layer-forming coating composition is cured, the coating may be air dried by holding it in air, or the coating may be heated in order to reduce the cure time. Preference is given to the composition which is curable by air drying.

The photocatalyst layer preferably has a thickness of 0.01 nm to 10 μm, more preferably 0.05 nm to 5 μm in order that the layer exert the photocatalytic function for a long time.

If the thickness is less than 0.01 nm, no sufficient photocatalytic activity is available and the layer on a substrate fails to maintain antifouling properties. If the thickness exceeds 10 μm, the photocatalyst layer itself may be degraded as by cracking during long-term outdoor exposure.

Alternatively, the laminate-covered article may be manufactured by preparing a laminate of the undercoat layer and the photocatalyst layer, and laying the laminate on at least one surface of a desired article as by attachment.

The inventive photocatalyst laminate described above has high transparency. The index of transparency is, for example, a Haze value according to JIS K7136. The photocatalyst laminate consisting of the photocatalyst layer and the undercoat layer preferably has a Haze value of up to 5, more preferably up to 3. If the Haze value of the photocatalyst laminate exceeds 5, the laminate is insufficiently transparent and impedes the outer appearance of the substrate to which the laminate is to be applied, with a possibility that the mating substrate is restricted.

It is noted that the Haze value is measured as follows. A Haze value of a photocatalyst laminate is determined by covering a soda glass plate having the given Haze value with the photocatalyst laminate, measuring the total Haze value of soda glass plate and photocatalyst laminate, and subtracting the Haze value of soda glass from the total Haze value.

The Haze value may be measured, for example, by a haze meter NDH-5000 (Nippon Denshoku Industries Co., Ltd.).

Also, the photocatalyst laminate of the invention is expected to maintain the photocatalytic function even after long-term outdoor exposure. Its index is how the photocatalyst laminate-covered article remains hydrophilic on its surface after a weathering test. Preferably the photocatalyst laminate has a contact angle with water of up to 30°, more preferably up to 20° on its surface (photocatalyst layer surface). If the contact angle with water on the substrate surface exceeds 30°, then the surface may become poorly antifouling.

Hydrophilicity may be evaluated in terms of water contact angle on surface (JIS R3257), specifically by measuring a change of water contact angle of the photocatalyst laminate-covered article.

The water contact angle may be measured, for example, by an automatic contact angle meter DM-501 (Kyowa Interface Science Co., Ltd.).

Further, an article covered with the photocatalyst laminate of the invention is expected to exhibit high weather resistance by virtue of its photocatalytic function. Weather resistance is evaluated in a weathering test, by using EYE UV ozone decomposition system OCA-150L-D (Iwasaki Electric Co., Ltd.) or EYE Super UV tester W-151 (Iwasaki Electric Co., Ltd.), for example, and irradiating UV radiation for a predetermined time.

In the weathering test, any environment of test conditions may be selected. An accumulative UV energy quantity of 1,500 $MJ/m^2$ corresponds to outdoor exposure over about 10 years.

The correlation of test conditions to outdoor exposure may be readily estimated. For example, an outdoor UV illuminance is $1 \times 10^1$ $W/m^2$, when measured at noon on fine Vernal Equinox Day at Matsuida, Annaka City, Gunma Pref, Japan, using a UV illuminometer (EYE UV illuminometer UVP365-1 by Iwasaki Electric Co., Ltd.). Assume that the annual average daily sunshine time is 12 hours, the accumulative illuminance is 12 (h/day)×365 (day/year)×10 (year)×10 ($W/m^2$)=438 ($kWh/m^2$)=1,500 ($MJ/m^2$).

When the facts that the outdoor environment depends on the latitude and weather, and the weathering test uses an artificial environment are taken into account, it is reasonable that an approximation of 1,500 MJ corresponds to outdoor exposure over 10 years. The test conditions may be changed depending on a particular environment where the cured film is used.

EXAMPLES

Examples and Comparative Examples are given below for further illustrating the invention, but the invention is not limited thereto.

[1] Preparation of Core/Shell Nanoparticle Dispersion and Titanium Oxide Nanoparticle Water Dispersion

[Synthesis Example 1] Preparation of Core/Shell Titanium Oxide Nanoparticle Water Dispersion TW-1

A water dispersion of core/shell titanium oxide nanoparticles each consisting of a core in the form of tetragonal titanium oxide nanoparticle having tin and manganese incorporated in solid solution and a shell of silicon oxide was prepared.

A water dispersion of core titanium oxide nanoparticles was first prepared and then mixed with an active silicic acid solution obtained from treatment of sodium silicate with a cation exchange resin, yielding a water dispersion of core/shell nanoparticles of titanium oxide/silicon oxide.

To 660 g of 36 wt % titanium(IV) chloride aqueous solution (trade name TC-36 by Ishihara Sangyo Kaisha, Ltd.) were added 33 g of 50% tin(IV) chloride solution (Nihon Kagaku Sangyo Co., Ltd.) and 0.9 g of manganese (II) monoxide (Kojundo Chemical Lab. Co., Ltd.). They were thoroughly mixed and diluted with 10 kg of deionized water. In this metal salt aqueous solution, the molar ratios of Ti to Sn and Mn were Ti/Sn=20 and Ti/Mn=100.

To the metal salt aqueous solution, 2.6 kg of 5 wt % aqueous ammonia (Wako Pure Chemical Industries, Ltd.) was gradually added for neutralization and hydrolysis, yielding a precipitate of titanium hydroxide containing tin and manganese. This titanium hydroxide slurry was at pH 8.

The precipitate of titanium hydroxide was deionized by repeating deionized water addition and decantation. To the precipitate of titanium hydroxide containing tin and manganese after deionization, 1 kg of 30 wt % aqueous hydrogen peroxide (Wako Pure Chemical Industries, Ltd.) was gradually added, whereupon stirring was continued at 60° C. for 3 hours for full reaction. Thereafter, deionized water was added for concentration adjustment, yielding a yellow transparent solution of tin and manganese-containing peroxotitanic acid (solids concentration 1 wt %).

An autoclave of 10 L volume (TAS-10 by Taiatsu Techno Co., Ltd.) was charged with 7 kg of the peroxotitanic acid solution synthesized above, which was subjected to hydrothermal reaction at 150° C. and 1.0 MPa for 180 minutes. The reaction mixture in the autoclave was then cooled to quench the reaction, obtaining a dispersion (T-1) of titanium oxide nanoparticles having tin and manganese incorporated in solid solution (solids concentration 1 wt %). A portion of the titanium oxide nanoparticle dispersion (T-1) was dried at 105° C. for 24 hours into a powder, which was analyzed by powder X-ray diffractometer (D2 Phaser by Bruker AXS) to find that the crystalline phase was of rutile type (tetragonal).

Sodium silicate having a concentration 29 wt % calculated as $SiO_2$ (JIS No. 3 soda silicate by Fuji Kagaku Corp.), 45 g, was diluted with 1,260 g of deionized water. To the sodium silicate aqueous solution was added 200 mL of strongly acidic cation exchange resin Amberjet 1024H (H+ type, Organo Corp.). By thorough stirring, sodium ions were removed. The ion exchange resin was filtered off, yielding an active silicic acid aqueous solution (solids concentration 1 wt %). With thorough stirring, 1 kg of the active silicic acid aqueous solution was slowly added dropwise to 4 kg of the titanium oxide nanoparticle water dispersion (T-1) whereby a coating of silicon oxide was formed on the surface of titanium oxide nanoparticles. The nanoparticle water dispersion thus obtained was concentrated to 10% by weight by ultrafiltration, yielding a water dispersion of core/shell titanium oxide nanoparticles (TW-1). The content of the silicon oxide shell was 18% by weight based on the overall core/shell titanium oxide nanoparticles in the water dispersion. A 50% cumulative distribution diameter on volume average was measured by the dynamic light scattering method (model Nanotrac, by Nikkiso Co., Ltd.), finding a diameter of 13.2 nm.

[Synthesis Example 2] Preparation of Core/Shell Titanium Oxide Nanoparticle Ethanol Dispersion TE-1

A four neck 2-L separable flask equipped with a Dimroth condenser, nitrogen inlet tube, thermometer and impeller was charged with 300 g of core/shell titanium oxide nanoparticles water dispersion (TW-1, solid concentration 10 wt %) prepared in Synthesis Example 1 and 3 g of sulfonic acid base cationic ion exchange resin as catalyst. Then 225 g of methyltrimethoxysilane (trade name KBM-13 by Shin-Etsu Chemical Co., Ltd.) was added to the flask, followed by rigorous stirring at 250 rpm. The behavior that by stirring, the dispersion reacted with the alkoxysilane and turned uniform was observed. It was also observed that the temperature of the dispersion rose from 25° C. to 52° C.

The dispersion was heated and stirred for 2 hours so that its temperature reached 50° C. With stirring at 250 rpm, 750 g of ethanol was added to the dispersion for dilution. The diluted dispersion was fed to a ultrafilter, from which 800 g of an exudate was taken out. The organic solvent (ethanol) was continuously supplied under pressure to the concentrated dispersion, during which the exudation behavior of the dispersion was observed. With the filter exit coupled to a receptacle (5,000 mL), the pressure supply of ethanol was continued until the exudate reached 800 g. The dispersion was taken out of the filtration chamber, obtaining an ethanol dispersion of titanium oxide solid-solution nanoparticles (TE-1). TE-1 had a solids concentration of 12 wt % and a water concentration of 0.9 wt %. The average particle size of TE-1 was measured by the dynamic light scattering method (model Nanotrac by Nikkiso Co., Ltd.), finding a size of 17.6 nm.

[Comparative Synthesis Example 1] Synthesis of Titanium Oxide Nanoparticle Dispersion TW-a First, 660 g of 36 wt % titanium(IV) chloride aqueous solution (trade name TC-36 by Ishihara Sangyo Kaisha, Ltd.) was diluted with 10 kg of deionized water. To the metal salt aqueous solution, 2.5 kg of 5 wt % aqueous ammonia (Wako Pure Chemical Industries, Ltd.) was gradually added for neutralization and hydrolysis, yielding a precipitate of titanium hydroxide. This titanium hydroxide slurry was at pH 8.

The precipitate of titanium hydroxide was deionized by repeating deionized water addition and decantation. To the precipitate of titanium hydroxide after deionization, 1 kg of 30 wt % aqueous hydrogen peroxide (Wako Pure Chemical Industries, Ltd.) was gradually added, whereupon stirring was continued at 60° C. for 3 hours for full reaction. Thereafter, deionized water was added for concentration adjustment, yielding a yellow transparent solution of peroxotitanic acid (solids concentration 1 wt %).

An autoclave of 10 L volume (trade name TAS-10 by Taiatsu Techno Co., Ltd.) was charged with 7 kg of the peroxotitanic acid solution synthesized above, which was subjected to hydrothermal reaction at 130° C. and 1.0 MPa for 120 minutes. The reaction mixture in the autoclave was then cooled to quench the reaction, obtaining a water dispersion of titanium oxide nanoparticles. The water dispersion was concentrated by ultrafiltration, obtaining a water dispersion of titanium oxide nanoparticles (TW-a, solids concentration 5 wt %). A portion of the titanium oxide nanoparticle water dispersion (TW-a) was dried at 105° C. for 24 hours into a powder, which was analyzed by powder X-ray diffractometer (D2 Phaser by Bruker AXS) to find that the crystalline phase was of anatase type. The powder had a average particle size of 18.5 nm as measured by the dynamic light scattering method (model Nanotrac by Nikkiso Co., Ltd.).

[2] Preparation of Undercoat Layer-Forming Coating Composition

Preparation Example 1-1

The core/shell titanium oxide nanoparticle water dispersion (TW-1) obtained in Synthesis Example 1 was added to a phenylsilicone resin emulsion (trade name X-52-8148 by Shin-Etsu Chemical Co., Ltd.) in such amounts that 10 parts by weight of solids in the water dispersion TW-1 was present per 100 parts by weight of solids in the emulsion. Deionized water was added to the mixture in such an amount as to give an overall solids concentration of 2% by weight. Thorough stirring and mixing yielded an undercoat layer-forming coating composition (UC-1). It was confirmed that the core/shell titanium oxide nanoparticles were transparently dispersed in the silicone resin emulsion without agglomeration.

Preparation Example 1-2

The core/shell titanium oxide nanoparticle ethanol dispersion (TE-1) obtained in Synthesis Example 2 was added to a phenylsilicone resin emulsion (trade name X-52-8148 by Shin-Etsu Chemical Co., Ltd.) in such amounts that 20 parts by weight of solids in the ethanol dispersion TE-1 was present per 100 parts by weight of solids in the emulsion. Deionized water was added to the mixture in such an amount as to give an overall solids concentration of 2% by weight. Thorough stirring and mixing yielded an undercoat layer-forming coating composition (UC-2). It was confirmed that the core/shell titanium oxide nanoparticles were transparently dispersed in the silicone resin emulsion without agglomeration.

Preparation Example 1-3

To 100 parts by weight of a methyl/phenyl-containing silicone alkoxy oligomer (trade name KR-401 by Shin-Etsu Chemical Co., Ltd.), 2 parts by weight of a curing catalyst (trade name D-25 by Shin-Etsu Chemical Co., Ltd.) and an amount of the core/shell titanium oxide nanoparticle ethanol dispersion (TE-1) obtained in Synthesis Example 2, sufficient to give 10 parts by weight of solids, were added. Methyl ethyl ketone (MEK) was added to the mixture in such an amount as to give an overall solids concentration of 10% by weight. Thorough stirring and mixing yielded an undercoat layer-forming coating composition to (UC-3). It was confirmed that the core/shell titanium oxide nanoparticles were transparently dispersed in the silicone alkoxy oligomer without agglomeration.

Preparation Example 1-4

To 100 parts by weight of a core/shell acrylic resin emulsion (trade name Acrit KS-3705, core/shell=acrylic resin/polysiloxane, organic/inorganic weight ratio=7/3, by Taisei Fine Chemical Co., Ltd.), the core/shell titanium oxide nanoparticle water dispersion (TW-1) obtained in Synthesis Example 1 was added in such an amount as to give 30 parts by weight of solids. Deionized water was added to the mixture in such an amount as to give an overall solids concentration of 2% by weight. Thorough stirring and mixing yielded an undercoat layer-forming coating composition (UC-4). It was confirmed that the core/shell titanium oxide nanoparticles were transparently dispersed in the core/shell silicone-modified acrylic resin emulsion without agglomeration.

Preparation Example 1-5

To 100 parts by weight of a fluoro-resin emulsion (trade name Zeffle SE-310, mixture of vinylidene fluoride copolymer and acrylic copolymer, by Daikin Industries Co., Ltd.), the core/shell titanium oxide nanoparticle water dispersion (TW-1) obtained in Synthesis Example 1 was added in such an amount as to give 20 parts by weight of solids. Deionized water was added to the mixture in such an amount as to give an overall solids concentration of 2% by weight. Thorough stirring and mixing yielded an undercoat layer-forming coating composition (UC-5). It was confirmed that the core/shell titanium oxide nanoparticles were transparently dispersed in the fluoro-resin emulsion without agglomeration.

Comparative Preparation Example 1-1

To 100 parts by weight of a phenylsilicone resin emulsion (trade name X-52-8148 by Shin-Etsu Chemical Co., Ltd.), the titanium oxide nanoparticle dispersion (TW-a) obtained in Comparative Synthesis Example 1 was added in such an amount as to give 10 parts by weight of solids. Deionized water was added to the mixture in such an amount as to give an overall solids concentration of 2% by weight. Thorough stirring and mixing yielded an undercoat layer-forming coating composition (UC-a). The titanium oxide nanoparticles agglomerated, with a lowering of transparency.

Comparative Preparation Example 1-2

To 100 parts by weight of a methyl/phenyl-containing silicone alkoxy oligomer (trade name KR-401 by Shin-Etsu Chemical Co., Ltd.), 2 parts by weight of a curing catalyst (trade name D-25 by Shin-Etsu Chemical Co., Ltd.) and 5 parts by weight of a hydroxyphenyltriazine base UV absorber (trade name Tinuvin 400 by BASF) were added. MEK was added to the mixture in such an amount as to give an overall solids concentration of 10% by weight. Thorough stirring and mixing yielded an undercoat layer-forming coating composition (UC-b). The hydroxyphenyltriazine base UV absorber dissolved, with transparency unchanged.

Comparative Preparation Example 1-3

To 100 parts by weight of a phenylsilicone resin emulsion (trade name X-52-8148 by Shin-Etsu Chemical Co., Ltd.), the core/shell titanium oxide nanoparticle ethanol dispersion (TE-1) obtained in Synthesis Example 2 was added in such an amount as to give 80 parts by weight of solids. Deionized water was added to the mixture in such an amount as to give an overall solids concentration of 2% by weight. Thorough stirring and mixing yielded an undercoat layer-forming coating composition (UC-c). Transparency lowered due to the high content of core/shell titanium oxide nanoparticles.

Comparative Preparation Example 1-4

Deionized water was added to a core/shell acrylic resin emulsion (trade name Acrit KS-3705, core/shell=acrylic resin/polysiloxane, organic/inorganic weight ratio=7/3, by Taisei Fine Chemical Co., Ltd.) in such an amount as to give a solids concentration of 2% by weight. Thorough stirring and mixing yielded an undercoat layer-forming coating composition (UC-d).

[3] Preparation of Photocatalyst Layer-Forming Coating Composition

Preparation Example 2-1

A photocatalyst layer-forming coating composition TC-1 was prepared by mixing anatase type titanium oxide nanoparticle dispersion (anatase type titanium oxide, average particle size 18 nm, 1 wt %, water dispersion) as photocatalyst particles with a silicate aqueous solution (silicate, 0.5 wt %, aqueous solution) as a binder in such amounts that the content ratio of photocatalyst to binder was 50/50 in weight ratio (the same, hereinafter).

Preparation Example 2-2

A photocatalyst layer-forming coating composition TC-2 was prepared by mixing anatase type titanium oxide nanoparticle dispersion (anatase type titanium oxide, average particle size 18 nm, 1 wt %, water dispersion) as photocatalyst particles with a core/shell acrylic resin emulsion (trade name Acrit KS-3705, core/shell=acrylic resin/polysiloxane, organic/inorganic weight ratio=7/3, by Taisei Fine Chemical Co., Ltd.) as a binder in such amounts that the content ratio of photocatalyst to binder was 50/50.

Preparation Example 2-3

A photocatalyst layer-forming coating composition TC-3 was prepared as in Preparation Example 2-1 except that the content ratio of photocatalyst to binder was 5/95.

[4] Preparation of Photocatalyst Laminate and Transparency Evaluation Thereof

Example 1-1

The undercoat layer-forming coating composition UC-1 obtained in Preparation Example 1-1 was applied to a soda glass plate (thickness 2 mm, Haze 0.2) by means of a low-pressure spray gun (model LPH-50, pneumatic pressure 0.3 MPa, by Anest Iwata Corp.) so as to give a layer thickness of 0.5 µm, and cured at 80° C. for 30 minutes. Next, the photocatalyst layer-forming coating composition TC-1 obtained in Preparation Example 2-1 was applied onto the undercoat layer so as to give a layer thickness of 0.1 µm and cured at 80° C. for 30 minutes, yielding a photocatalyst laminate PL-1.

Example 1-2

The undercoat layer-forming coating composition UC-1 obtained in Preparation Example 1-1 was applied to a soda glass plate (thickness 2 mm, Haze 0.2) by means of a low-pressure spray gun (model LPH-50, pneumatic pressure 0.3 MPa, by Anest Iwata Corp.) so as to give a layer thickness of 6 µm, and cured at 80° C. for 30 minutes to form an undercoat layer. Next, the photocatalyst layer-forming coating composition TC-1 obtained in Preparation Example 2-1 was applied onto the undercoat layer so as to give a layer thickness of 0.1 µm and cured at 80° C. for 30 minutes, yielding a photocatalyst laminate PL-2.

Example 1-3

The undercoat layer-forming coating composition UC-2 obtained in Preparation Example 1-2 was applied to a soda glass plate (thickness 2 mm, Haze 0.2) by means of a low-pressure spray gun (model LPH-50, pneumatic pressure 0.3 MPa, by Anest Iwata Corp.) so as to give a layer thickness of 0.5 µm, and cured at 80° C. for 30 minutes to form an undercoat layer. Next, the photocatalyst layer-forming coating composition TC-1 obtained in Preparation Example 2-1 was applied onto the undercoat layer so as to give a layer thickness of 0.1 µm and cured at 80° C. for 30 minutes, yielding a photocatalyst laminate PL-3.

Example 1-4

The undercoat layer-forming coating composition UC-3 obtained in Preparation Example 1-3 was applied to a soda glass plate (thickness 2 mm, Haze 0.2) by means of a low-pressure spray gun (model LPH-50, pneumatic pressure 0.3 MPa, by Anest Iwata Corp.) so as to give a layer thickness of 1 µm, and cured at 80° C. for 30 minutes to form an undercoat layer. Next, the photocatalyst layer-forming coating composition TC-1 obtained in Preparation Example 2-1 was applied onto the undercoat layer so as to give a layer thickness of 0.1 µm and cured at 80° C. for 30 minutes, yielding a photocatalyst laminate PL-4.

Example 1-5

The undercoat layer-forming coating composition UC-4 obtained in Preparation Example 1-4 was applied to a soda glass plate (thickness 2 mm, Haze 0.2) by means of a low-pressure spray gun (model LPH-50, pneumatic pressure 0.3 MPa, by Anest Iwata Corp.) so as to give a layer thickness of 2 µm, and cured at 80° C. for 30 minutes to form an undercoat layer. Next, the photocatalyst layer-forming coating composition TC-2 obtained in Preparation Example 2-2 was applied onto the undercoat layer so as to give a layer thickness of 2 µm and cured at 80° C. for 30 minutes, yielding a photocatalyst laminate PL-5.

Example 1-6

The undercoat layer-forming coating composition UC-5 obtained in Preparation Example 1-5 was applied to a soda glass plate (thickness 2 mm, Haze 0.2) by means of a low-pressure spray gun (model LPH-50, pneumatic pressure 0.3 MPa, by Anest Iwata Corp.) so as to give a layer thickness of 3 µm, and cured at 80° C. for 30 minutes to form an undercoat layer. Next, the photocatalyst layer-forming coating composition TC-3 obtained in Preparation Example 2-3 was applied onto the undercoat layer so as to give a layer thickness of 0.1 µm and cured at 80° C. for 30 minutes, yielding a photocatalyst laminate PL-6.

Comparative Example 1-1

The undercoat layer-forming coating composition UC-a obtained in Comparative Preparation Example 1-1 was applied to a soda glass plate (thickness 2 mm, Haze 0.2) by means of a low-pressure spray gun (model LPH-50, pneumatic pressure 0.3 MPa, by Anest Iwata Corp.) so as to give a layer thickness of 0.5 µm, and cured at 80° C. for 30 minutes to form an undercoat layer. Next, the photocatalyst layer-forming coating composition TC-1 obtained in Preparation Example 2-1 was applied onto the undercoat layer so as to give a layer thickness of 0.1 µm and cured at 80° C. for 30 minutes, yielding a photocatalyst laminate PL-a.

Comparative Example 1-2

The undercoat layer-forming coating composition UC-b obtained in Comparative Preparation Example 1-2 was applied to a soda glass plate (thickness 2 mm, Haze 0.2) by means of a low-pressure spray gun (model LPH-50, pneumatic pressure 0.3 MPa, by Anest Iwata Corp.) so as to give a layer thickness of 0.5 µm, and cured at 80° C. for 30 minutes to form an undercoat layer. Next, the photocatalyst layer-forming coating composition TC-1 obtained in Preparation Example 2-1 was applied onto the undercoat layer so as to give a layer thickness of 0.1 µm and cured at 80° C. for 30 minutes, yielding a photocatalyst laminate PL-b.

Comparative Example 1-3

The undercoat layer-forming coating composition UC-c obtained in Comparative Preparation Example 1-3 was applied to a soda glass plate (thickness 2 mm, Haze 0.2) by means of a low-pressure spray gun (model LPH-50, pneumatic pressure 0.3 MPa, by Anest Iwata Corp.) so as to give a layer thickness of 0.5 μm, and cured at 80° C. for 30 minutes to form an undercoat layer. Next, the photocatalyst layer-forming coating composition TC-1 obtained in Preparation Example 2-1 was applied onto the undercoat layer so as to give a layer thickness of 0.1 μm and cured at 80° C. for 30 minutes, yielding a photocatalyst laminate PL-c.

Comparative Example 1-4

The undercoat layer-forming coating composition UC-d obtained in Comparative Preparation Example 1-4 was applied to a soda glass plate (thickness 2 mm, Haze 0.2) by means of a low-pressure spray gun (model LPH-50, pneumatic pressure 0.3 MPa, by Anest Iwata Corp.) so as to give a layer thickness of 2 μm, and cured at 80° C. for 30 minutes to form an undercoat layer. Next, the photocatalyst layer-forming coating composition TC-3 obtained in Preparation Example 2-3 was applied onto the undercoat layer so as to give a layer thickness of 0.1 μm and cured at 80° C. for 30 minutes, yielding a photocatalyst laminate PL-d.

Comparative Example 1-5

The photocatalyst layer-forming coating composition TC-1 obtained in Preparation Example 2-1 was applied to a soda glass plate (thickness 2 mm, Haze 0.2) by means of a low-pressure spray gun (model LPH-50, pneumatic pressure 0.3 MPa, by Anest Iwata Corp.) so as to give a layer thickness of 0.1 μm, and cured at 80° C. for 30 minutes, yielding a photocatalyst-covered glass plate PL-e.

The photocatalyst laminates and photocatalyst-covered glass plate obtained in Examples 1-1 to 1-6 and Comparative Examples 1-1 to 1-5 were measured for Haze by a haze meter NDH-5000 (Nippon Denshoku Industries Co., Ltd.). The results are shown in Table 1.

[5] Preparation of Photocatalyst Laminate and Weather Resistance Evaluation

Example 2-1

A white aqueous acrylic paint based on acrylic resin (Hapio Color by Kanpe Hapio Co., Ltd.) was applied onto a glass plate with a brush and kept at room temperature for 3 hours, yielding a coated plate. A photocatalyst laminate-covered coated substrate PL-7 to including UC-1 and TC-1 was obtained as in Example 1-1 aside from using the coated plate instead of the soda glass plate.

Example 2-2

A photocatalyst laminate-covered coated substrate PL-8 including UC-1 and TC-1 was prepared as in Example 1-2 aside from using the coated plate of Example 2-1 instead of the soda glass plate.

Example 2-3

A photocatalyst laminate-covered coated substrate PL-9 including UC-2 and TC-1 was prepared as in Example 1-3 aside from using the coated plate of Example 2-1 instead of the soda glass plate.

Example 2-4

A photocatalyst laminate-covered coated substrate PL-10 including UC-3 and TC-1 was prepared as in Example 1-4 aside from using the coated plate of Example 2-1 instead of the soda glass plate.

TABLE 1

| | | Laminate construction | | | |
| --- | --- | --- | --- | --- | --- |
| | Laminate | Undercoat layer | Photocatalyst layer | Layer thickness (undercoat layer/photocatalyst layer) | Haze |
| Example | 1-1 PL-1 | UC-1 | TC-1 | 0.5/0.1 | 2.2 |
| | 1-2 PL-2 | UC-1 | TC-1 | 6/0.1 | 3.5 |
| | 1-3 PL-3 | UC-2 | TC-1 | 0.5/0.1 | 2.5 |
| | 1-4 PL-4 | UC-3 | TC-1 | 1/0.1 | 1.8 |
| | 1-5 PL-5 | UC-4 | TC-2 | 2/2 | 4.6 |
| | 1-6 PL-6 | UC-5 | TC-3 | 3/0.1 | 3.2 |
| Comparative Example | 1-1 PL-a | UC-a | TC-1 | 0.5/0.1 | 20.5 |
| | 1-2 PL-b | UC-b | TC-1 | 0.5/0.1 | 2.4 |
| | 1-3 PL-c | UC-c | TC-1 | 0.5/0.1 | 18.6 |
| | 1-4 PL-d | UC-d | TC-3 | 2/0.1 | 2.5 |
| | 1-5 PL-e | — | TC-1 | —/0.1 | 2.0 |

As seen from Table 1, the photocatalyst laminates prepared in Examples 1-1 to 1-6 are highly transparent, demonstrating that the substrate is coated without hindering the outer appearance thereof.

By contrast, the laminate of Comparative Example 1-1 using anatase type titanium oxide nanoparticles as the UV absorber is less transparent because the nanoparticles agglomerate in the silicone resin.

The laminate of Comparative Example 1-3 using core/shell titanium oxide nanoparticles as the UV absorber in an amount relative to the resin in excess of the range defined in the invention includes the undercoat layer which is less transparent.

Example 2-5

A photocatalyst laminate-covered coated substrate PL-11 including UC-4 and TC-2 was prepared as in Example 1-5 aside from using the coated plate of Example 2-1 instead of the soda glass plate.

Example 2-6

A photocatalyst laminate-covered coated substrate PL-12 including UC-5 and TC-3 was prepared as in Example 1-6 aside from using the coated plate of Example 2-1 instead of the soda glass plate.

Comparative Example 2-1

A photocatalyst laminate-covered coated substrate PL-f including UC-a and TC-1 was prepared as in Comparative Example 1-1 aside from using the coated plate of Example 2-1 instead of the soda glass plate.

Comparative Example 2-2

A photocatalyst laminate-covered coated substrate PL-g including UC-b and TC-1 was prepared as in Comparative Example 1-2 aside from using the coated plate of Example 2-1 instead of the soda glass plate.

Comparative Example 2-3

A photocatalyst laminate-covered coated substrate PL-h including UC-c and TC-1 was prepared as in Comparative Example 1-3 aside from using the coated plate of Example 2-1 instead of the soda glass plate.

Comparative Example 2-4

A photocatalyst laminate-covered coated substrate PL-i including UC-d and TC-3 was prepared as in Comparative Example 1-4 aside from using the coated plate of Example 2-1 instead of the soda glass plate.

Comparative Example 2-5

A photocatalyst-covered coated substrate PL-j including TC-1 was prepared as in Comparative Example 1-5 aside from using the coated plate of Example 2-1 instead of the soda glass plate.

The photocatalyst laminate-covered coated substrates and photocatalyst-covered coated substrate obtained in Examples 2-1 to 2-6 and Comparative Examples 2-1 to 2-5 were evaluated for photocatalytic function prior to a weathering test, by irradiating UV from a black light (FL10BLB-A by Toshiba Co., Ltd.) at a UV irradiation intensity of 1 mW/cm$^2$ for 24 hours and thereafter, measuring a contact angle with water by a contact angle meter (DM-501 by Kyowa Interface Science Co., Ltd.).

After the weathering test of exposing a sample to UV light in an environment of test conditions including UV intensity 1×10$^3$ W/m$^2$, temperature 60° C. and humidity 50% RH, in an accumulative UV energy quantity of 1,500 MJ/m$^2$, a contact angle with water was measured again, obtaining the data after the weathering test. The results of contact angle with water are shown in Table 2.

As seen from Table 2, the coated plates covered with the photocatalyst laminates of Examples 2-1 to 2-6 maintain a high photocatalytic function even after the weathering test.

By contrast, the coated plate of Comparative Example 2-1 wherein anatase type titanium oxide as the UV absorber is added to the undercoat layer and the coated plate of Comparative Example 2-2 wherein the hydroxyphenyltriazine compound as the UV absorber is added to the undercoat layer fail to maintain a photocatalytic function after the weathering test.

Also, the coated plate of Comparative Example 2-4 wherein the UV absorber is not to added to the undercoat layer and the coated plate of Comparative Example 2-5 devoid of the undercoat layer fail to maintain a photocatalytic function after the weathering test.

It is evident from the foregoing results that the photocatalyst laminate within the scope of the invention has so high transparency that it is applicable to a variety of substrates, and so high weather resistance that it may develop an antifouling function on outdoor use over a long period of time.

The invention claimed is:

1. A photocatalyst laminate adapted to be disposed on a substrate, the laminate comprising an undercoat layer and a photocatalyst layer laid on a surface of the undercoat layer,
    said undercoat layer comprising
    (A) 100 parts by weight of a resin component and
    (B) 0.1 to 50 parts by weight of core/shell nanoparticles each consisting of a core in the form of a tetragonal titanium oxide solid-solution nanoparticle having tin and manganese incorporated in solid solution and a shell of silicon oxide around the core, and
    said photocatalyst layer comprises an anatase-type titanium oxide photocatalyst.

2. The photocatalyst laminate of claim 1 wherein the undercoat layer has a thickness of 0.01 to 10 μm and the photocatalyst layer has a thickness of 0.01 to 10 μm.

3. The photocatalyst laminate of claim 1 or 2 wherein the resin component is one or more resins selected from the group consisting of silicone resins, silicone-modified resins, and fluoro-resins.

4. The photocatalyst laminate of claim 1, having a Haze value of up to 5.

5. The photocatalyst laminate of claim 1 wherein the photocatalyst layer has a contact angle with water of up to 30° on its surface after UV exposure in an accumulative UV energy quantity of 1,500 MJ/m$^2$.

TABLE 2

| | | Laminate construction | | Layer thickness | Contact angle with water | |
| --- | --- | --- | --- | --- | --- | --- |
| | | | | | Prior to | After |
| | Coated plate | Undercoat layer | Photocatalyst layer | (Undercoat layer/ Photocatalyst layer) | weathering test | weathering test |
| Example | 2-1 PL-7 | UC-1 | TC-1 | 0.5/0.1 | 10 | 11 |
| | 2-2 PL-8 | UC-1 | TC-1 | 6/0.1 | 10 | 18 |
| | 2-3 PL-9 | UC-2 | TC-1 | 0.5/0.1 | 10 | 10 |
| | 2-4 PL-10 | UC-3 | TC-1 | 1/0.1 | 10 | 11 |
| | 2-5 PL-11 | UC-4 | TC-2 | 2/2 | 28 | 27 |
| | 2-6 PL-12 | UC-5 | TC-3 | 3/0.1 | 8 | 18 |
| Comparative Example | 2-1 PL-f | UC-a | TC-1 | 0.5/0.1 | 10 | 67 |
| | 2-2 PL-g | UC-b | TC-1 | 0.5/0.1 | 10 | 65 |
| | 2-3 PL-h | UC-c | TC-1 | 0.5/0.1 | 10 | 16 |
| | 2-4 PL-i | UC-d | TC-3 | 2/0.1 | 10 | 65 |
| | 2-5 PL-j | — | TC-1 | —/0.1 | 10 | 68 |

6. The photocatalyst laminate of claim 1 wherein the shell of silicon oxide on the surface of the core/shell nanoparticle has an organosilyl group bonded via a siloxane bond.

7. An article comprising a substrate and a photocatalyst laminate disposed thereon,
    said photocatalyst laminate being the photocatalyst laminate of claim 1, the undercoat layer of the laminate being disposed adjacent to the substrate.

* * * * *